(12) United States Patent
Chiang

(10) Patent No.: US 8,144,242 B2
(45) Date of Patent: *Mar. 27, 2012

(54) IMAGE SENSOR HOLDER

(75) Inventor: Wen-Lin Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 354 days.

This patent is subject to a terminal disclaimer.

(21) Appl. No.: 12/500,579

(22) Filed: Jul. 9, 2009

(65) Prior Publication Data

US 2010/0149409 A1 Jun. 17, 2010

(30) Foreign Application Priority Data

Dec. 12, 2008 (CN) .......................... 2008 1 0306204

(51) Int. Cl.
  *H04N 5/225* (2006.01)
(52) U.S. Cl. .................. 348/373; 348/208.99; 348/335; 74/10.9; 74/469; 74/813
(58) Field of Classification Search .................. 348/373, 348/374, 375, 335, 208.99, 208.1–208.16; 74/10.8, 10.9, 813, 827, 469, 609; D16/200, D16/325, 326, 334, 336

See application file for complete search history.

(56) References Cited

U.S. PATENT DOCUMENTS

| | | | | |
|---|---|---|---|---|
| 7,379,093 | B2 * | 5/2008 | Seo ............................ | 348/208.4 |
| 7,714,893 | B2 * | 5/2010 | Makii ....................... | 348/208.99 |
| 2008/0151065 | A1 * | 6/2008 | Okumura et al. .......... | 348/208.4 |
| 2009/0009657 | A1 * | 1/2009 | Kawai ........................... | 348/373 |
| 2009/0128637 | A1 * | 5/2009 | Noji ............................ | 348/208.1 |
| 2010/0110281 | A1 * | 5/2010 | Chang et al. ................ | 348/373 |

* cited by examiner

*Primary Examiner* — Tuan Ho
*Assistant Examiner* — Kent Wang
(74) *Attorney, Agent, or Firm* — Atlis Law Group, Inc.

(57) ABSTRACT

An image sensor holder includes a frame, first and second slidable holders, first and second driving devices, first and second driving arms, and at least two elastic members. The first slidable holder is slidably mounted on the frame. The second slidable holder is slidably mounted on the first slidable holder. The first and second driving devices are separately mounted on the frame. The first driving arm is mounted on the frame and contacts to the first slidable holder and the first driving device by opposite ends thereof. The second driving arm is slidably mounted on the frame extending from the second slidable holder, and contacts the second driving device by an end thereof. The two elastic members are separately positioned between the first holder and the frame and between the first holder and the second holder.

15 Claims, 6 Drawing Sheets

IMAGE SENSOR HOLDER

BACKGROUND

1. Technical Field

The disclosure relates to an image sensor holder applied in an image capture device.

2. Description of the Related Art

The image sensor is a critical element in image capture devices. If an image capture device experiences vibration or movement during image capture, the image sensor is likely to form blurred images. Therefore, the image sensor is generally received in a movable holder which can move along X and Y directions to compensate for vibration shift of the image sensor when vibrated. However, the vibration compensation forms increased deviation and the images are still blurred.

Therefore, it is desirable to provide an image sensor holder which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the image sensor holder. Moreover, in the drawings, like reference numerals designate corresponding parts throughout the views.

DETAILED DESCRIPTION

Figure 1:
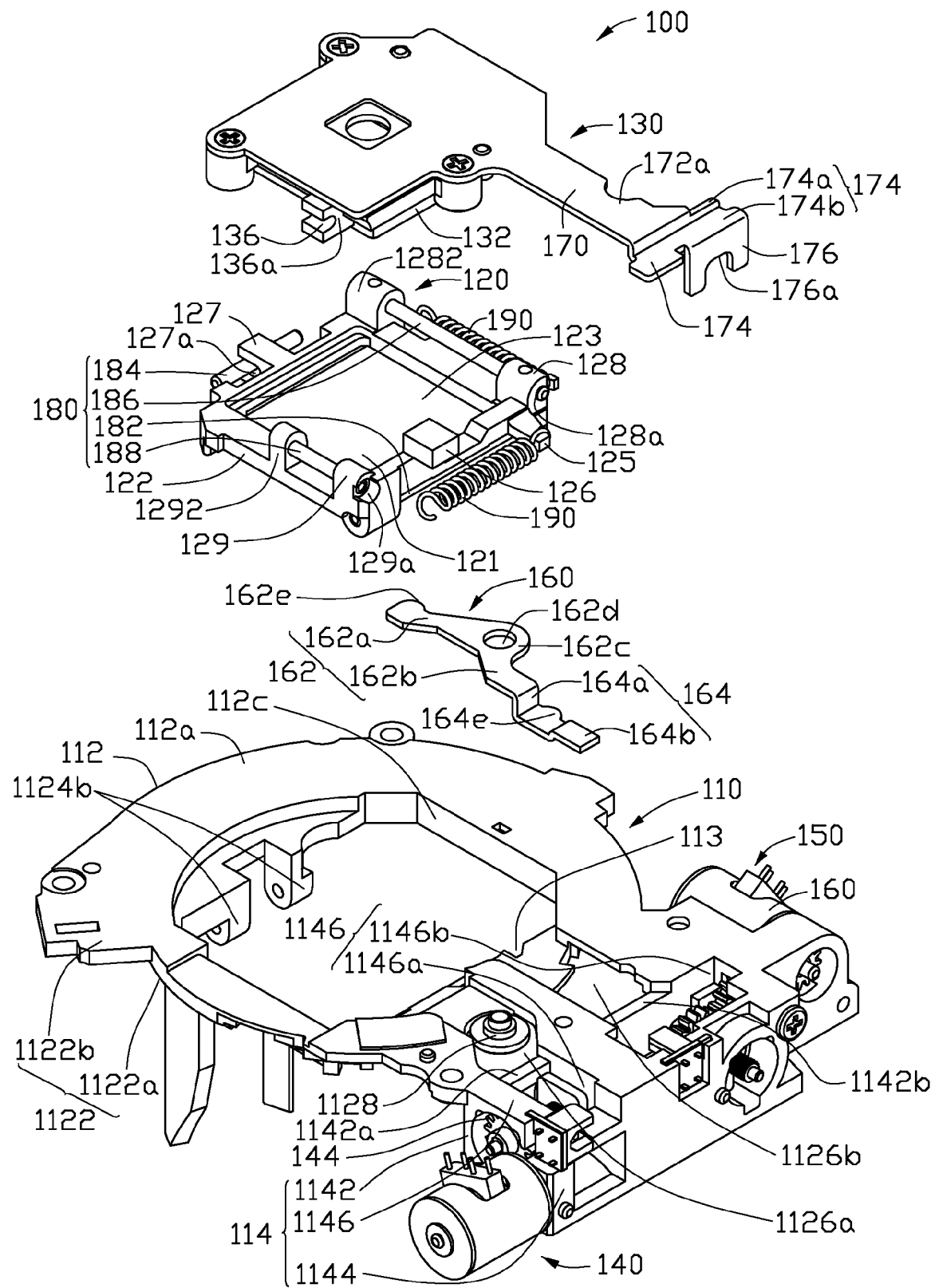
FIG. 1 is an isometric, exploded view of an image sensor holder, according to an embodiment.
Figure 2:
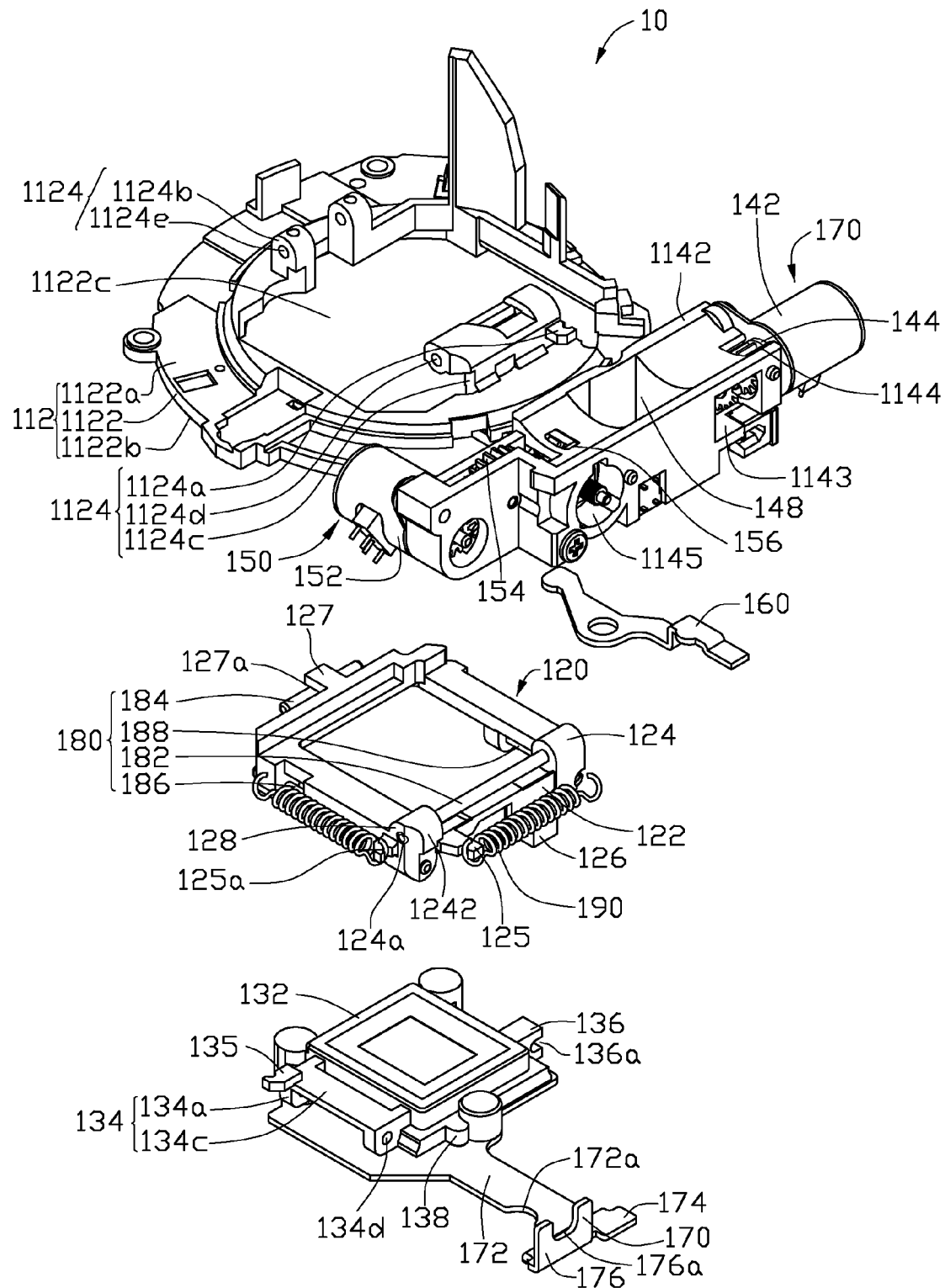
FIG. 2 is another isometric, exploded view of the image sensor holder of FIG. 1 viewed from a different perspective.
Figure 3:
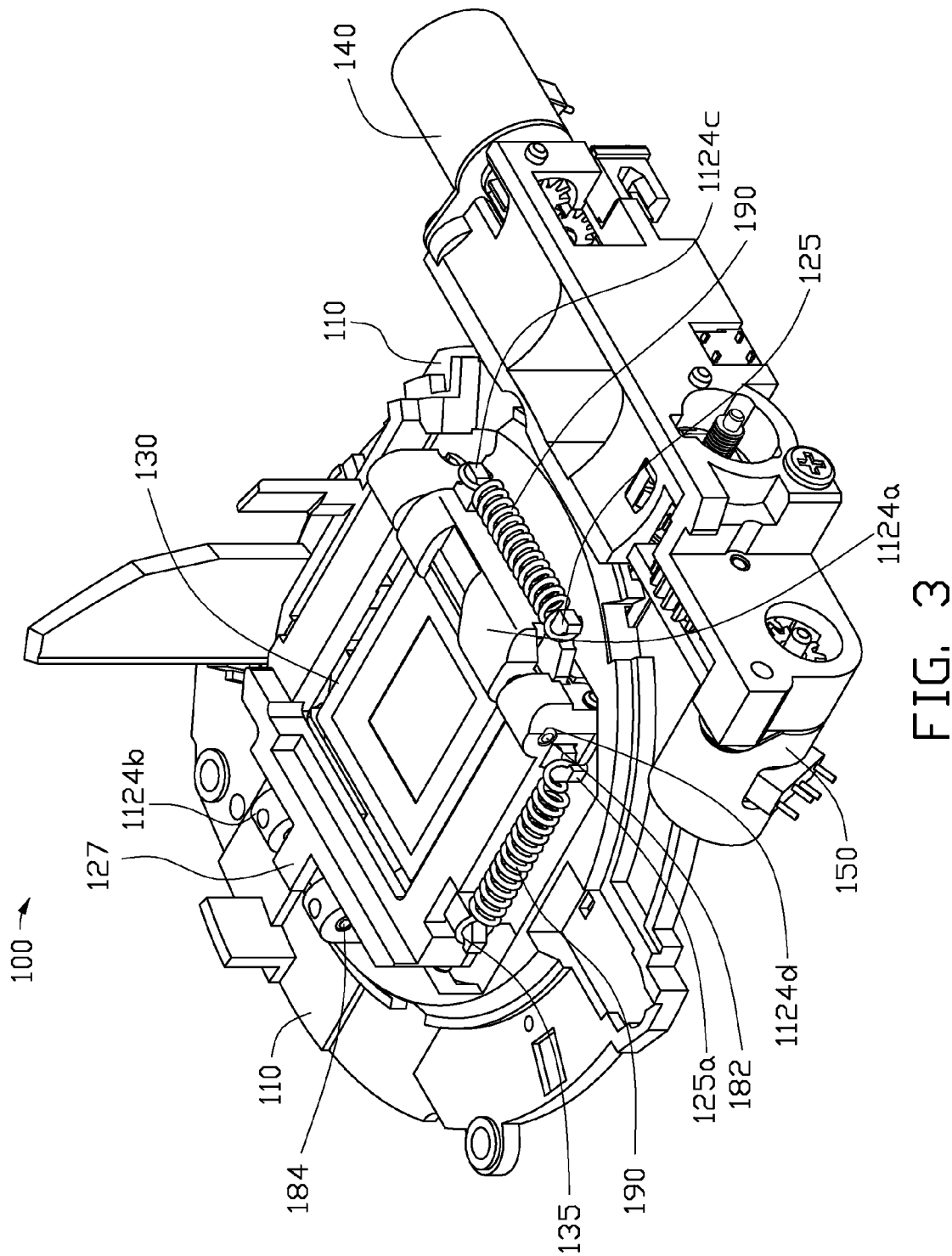
FIG. 3 is an isometric, assembled view of the image sensor holder of FIG. 2.
Figure 4:
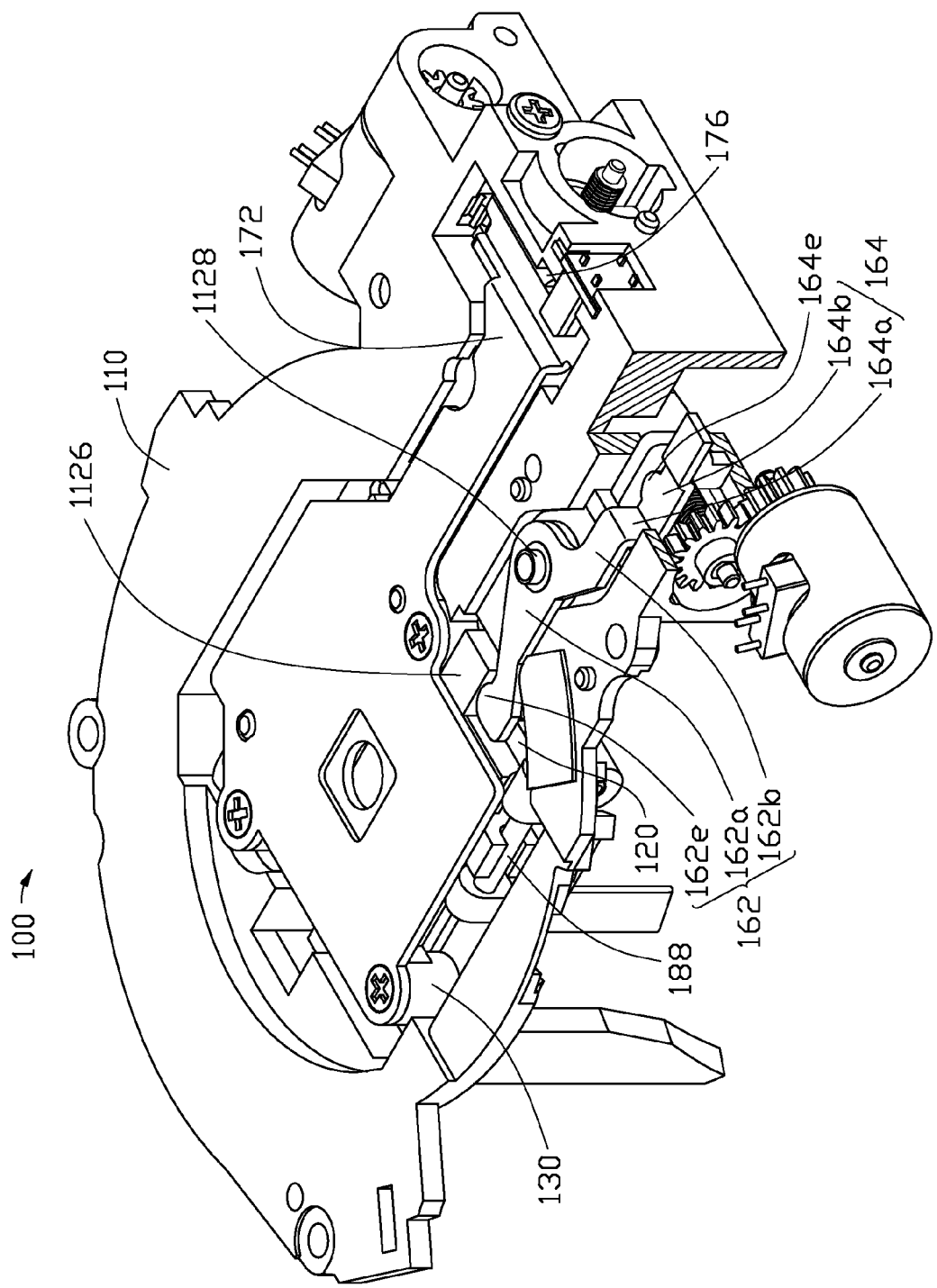
FIG. 4 is an isometric assembled view of the image sensor holder of FIG. 1 viewed from another perspective.

Referring to FIGS. 1 to 4, an image sensor holder 100, in accordance with an embodiment, is disclosed. The image sensor holder 100 includes a frame 110, a first and a second slidable holders 120, 130, a first and a second driving devices 140, 150, a first and a second driving arms 160, 170, a number of shafts 180, and at least two elastic members 190.

The first slidable holder 120 is slidably mounted on the frame 110 via two shafts 180. The second slidable holder 130 is slidably mounted on the first slidable holder 120 via another two shafts 180. The first and second driving devices 140, 150 are separately mounted on the frame 110. The first driving arm 160 is rotatably mounted on the frame 110 and contacts the first slidable holder 120 and the first driving device 140 at opposite ends thereof, transmitting driving force from the first driving device 140 to move the first slidable holder 120 relative to the frame 110. The second driving arm 170 extends from the second slidable holder 130 to the second driving device 150 for transmitting driving force from the second driving device 150 to move the second slidable holder 130 relatively to the first holder 120 in a direction orthogonal to the moving direction of the first slidable holder 120. One elastic member 190 is fixed between the first holder 120 and the frame 110, and another elastic member 190 between the second holder 130 and the first holder 120, for restoring the first and second holders 120, 130 to their original positions. In this embodiment, the elastic members 190 are compression springs. Alternatively, the elastic members 190 can be plastic bodys.

The frame 110 includes a first support 112 connected side-by-side with a second support 114.

The first support 112 includes a substrate 1122 having an upper surface 1122a and an opposite lower surface 1122b, a first shaft holder 1124, and a pivot 1128. The substrate 1122 defines a window 1122c running through the upper and lower surfaces 1122a, 1122b. The first shaft holder 1124 is formed substantially perpendicular on the upper surface 1122a adjacent to the window 1122c and protruding from the upper surface 1122a. The first shaft holder 1124 includes a right-side holder 1124a and a corresponding left-side holder 1124b, which oppositely stands on respective sides of the window 1122c. The left-side holder 1124b includes a first hook 1124c formed thereon. The right-side holder 1124a defines a first through hole 1124d therein. The left-side holder 1124b defines a second through hole 1124e therein. The window 1122c includes an opening 113 formed on the upper surface 1122a and adjacent to the left-side holder 1124b. A first sliding channel 1126a and a second sliding channel 1126b are adjacently defined on the lower surface 1122b of the substrate 1122, adjacent to the right-side holder 1124a and communicating with the window 1122c. The pivot 1128 is formed on the bottom of the first sliding channel 1126a.

The second support 114 is adjacent to the first and second sliding channels 1126a, 1126b. The second support 114 includes an inner plate 1142, an outer plate 1144 perpendicular thereto, a top plate 1146 connecting the inner and outer plates 1142, 1144, and a number of spacers 1148 substantially perpendicularly connected to the inner, outer and top plates 1142, 1144, 1146. The inner plate 1142 is perpendicularly connected on a side of the substrate 1122 and adjacent to the first and second sliding channels 1126a, 1126b. The top plate 1146 and the substrate 1122 are substantially coplanar. The top plate 1146 defines a first hole 1146a and a second hole 1146b therein corresponding to the first and second sliding channels 1126a, 1126b. The inner plate 1142 defines a first cutout 1142a communicating with the first sliding channel 1126a and the first hole 1146a, and a second cutout 1142b communicating with the second sliding channel 1126b and the second hole 1146b. The spacers 1148 partition the space defined by the inner, outer and top plates 1142, 1144 and 1146 into a first compartment 1143 and a second compartment 1145. The first compartment 1143 communicates with the first hole 1146a. The second compartment 1145 communicates with the second hole 1146b.

The first slidable holder 120 is an approximately square framework and includes a number of first frame walls 122 perpendicularly connected to define a first receiving space 123 therein, a pair of first holding portions 124, 1242, a second hook 125, a protrusion 126, a U-shaped member 127, a pair of second holding portions 128, 1282, a pair of third holding portions 129, 1292 and a third hook 125a.

The pair of first holding portions 124, 1242 is oppositely formed on two adjacent joined portions of the first frame walls 122, and each of the holding portions 124, 1242 defines a first shaft hole 124a therein. The first shaft holes 124a are aligned and receive one of the shafts 180 therein. The second hook 125 protrudes outwards from an outer surface of the first frame wall 122 between the first holding portions 124, 1242, and cooperates with the first hook 1124c to hitch the elastic member 190 therebetween. The protrusion 126 is formed on the first frame wall 122 where the first hook 1124c is formed, and projects outwards from an outer surface of the frame wall 122. The U-shaped member 127 is formed on an outer surface of another first frame wall 122 parallel to the first frame wall 122 having the second hook 125 and the protrusion 126. The U-shaped member 127 defines a sliding cutout 127a thereon. The pair of second holding portions 128, 1282 and the pair of third holding portions 129, 1292 are respectively formed on two parallel first frame walls 122 perpendicularly connected to the other first frame wall 122 having the second hook 125 and the protrusion 126, and are protruding away from the first holding portions 124. Each of the second holding portions 128, 1282 defines a second shaft hole 128a therein. The second shaft holes 128a are aligned with each other. Each of the third holding portions 129, 1292 defines a third shaft hole 129a therein. The third shaft holes 129a are aligned with each other. The third hook 125a protrudes from the second holding portion 128.

The second slidable holder 130 is similar to the first slidable holder 120, and includes a number of second frame walls 132 perpendicularly connected in turns, a fourth holding portion 134, a fourth hook 135, a sliding block 136, and a jutting portion 138. The fourth holding portion 134 is formed on one second frame wall 132 corresponding to the pair of second holding portions 128, 1282 of the first slidable holder 120. The fourth holding portion includes two separate supporting arms 134a connected by a connecting plate 134c. Each of the supporting arms 134a defines a fourth shaft hole 134d therein. The fourth shaft holes 134d of the supporting arm 134a are aligned with each other. The fourth hook 135 is formed on the connecting plate 134c corresponding to the third hook 125a of the first slidable holder 120 and separated from the third hook 125a. The sliding block 136 is formed on the second frame wall 132 parallel to the frame wall 132 having the fourth holding portion 134 formed thereon. The sliding block 136 protrudes outwards from an outer surface of the second frame wall 132, and defines a sliding groove 136a therein. The jutting portion 138 is formed on the second frame wall 132 orthogonal to the second frame wall 132 having the fourth holding portion 134 formed thereon, and has a smooth convex surface.

The first driving device 140 includes a first motor 142, a first transmitting mechanism 144 meshed with the first motor 142, and a first follower 146 drivably connected to the first transmitting mechanism 144.

The second driving device 150 includes a second motor 152, a second transmitting mechanism 154 meshed with the second motor 152, and a second follower 156 drivably connected to the second transmitting mechanism 154.

The first driving arm 160 includes a driving portion 162 and a follower portion 164 connected to the driving portion 162. The driving portion 162 includes a front arm 162a, a rear arm 162b, and a first convex block 162e extending from the front arm 162a and being planar as the front arm 162a. The front arm 162a and the rear arm 162b are connected together at an angle and cooperatively form a corner portion 162c. The corner portion 162c defines a pivot hole 162d therein. The follower portion 164 includes a connecting arm 164a perpendicularly connected to the rear arm 162b of the driving portion 162, a contact arm 164b perpendicularly connected to the connecting arm 164a and substantially parallel to the rear arm 162b. The follower portion 164 further includes a second convex block 164e extending from the contact arm 164b.

The second driving arm 170 includes a sliding plate 172, a limiting plate 174 connected to the sliding plate 172, and a contact plate 176 connected to the limiting plate 174. The limiting plate 174 includes an upright plate 174a perpendicularly connected to an end of the sliding plate 172, and a wing plate 174b perpendicularly connected to the upright plate 174a. The contact plate 176 is perpendicularly connected to the wing plate 174b by one end thereof, and the other end thereof defines a U-shaped opening 176a therein.

The shaft 180 is configured for slidably connecting the frame 110, and the first and second slidable holders 120, 130. In this embodiment, the image sensor holder 100 includes four shafts 182, 184, 186 and 188.

During assembly, the first and second motors 142, 152 of the driving devices 140, 150 are mounted on the second support 114 of the frame 110. The first and second transmitting mechanisms 144, 154 and the first and second followers 146, 156 are respectively positioned into the first and second compartments 1143, 1145 of the second support 114 of the frame 110. The first shaft 182 is inserted into the first shaft hole 124a of the first slidable holder 120 and received in the corresponding first through hole 1124d of the frame 110. The second shaft 184 is inserted into the sliding cutout 127a of the first slidable holder 120 and received in the corresponding second through hole 1124e of the frame 110. The first and second shafts 182, 184 are parallel with each other for slidably connecting the first slidable holder 120 and the frame 110. The third shaft 186 is inserted through the second shaft hole 128a of the first slidable holder 120 and received in the corresponding fourth shaft hole 134d of the second slidable holder 130. The fourth shaft 188 is inserted through the third shaft hole 129a of the first slidable holder 120 and received in the corresponding sliding groove 136a of the second slidable holder 130. The third shaft 186 and fourth shaft 188 are parallel with each other for slidably connecting the first slidable holder 120 and second slidable holder 130. The elastic members 190 are respectively hitched by the first to fourth hooks 1124c, 125, 125a and 135.

The first driving arm 160 is pivoted on the pivot 1128 of the frame 110 by the pivot hole 162d. The front arm 162a and a portion of the rear arm 162b of the front portion 162 are positioned in the first sliding channel 1126a, and the first convex block 162e formed on the front arm 162a abuts the protrusion 126 of the first slidable holder 120. The rear portion 164 of the first driving arm 160 is positioned in the first compartment 1143 and abuts against the first follower 146 of the first driving device 140 via the second convex block 164e of the contact arm 164b.

The second driving arm 170 is positioned in and moves along second sliding channel 1126b by the sliding plate 172. The limiting plate 174 and the contact plate 176 are positioned in the second compartment 1145. The contact plate 176 of the second driving arm 170 abuts the second follower 156 of the second motor 150. The U-shaped opening 176a of the contact plate 176 is configured for avoiding interference with the transmitting mechanism 154 of the second motor 150.

Figure 5:
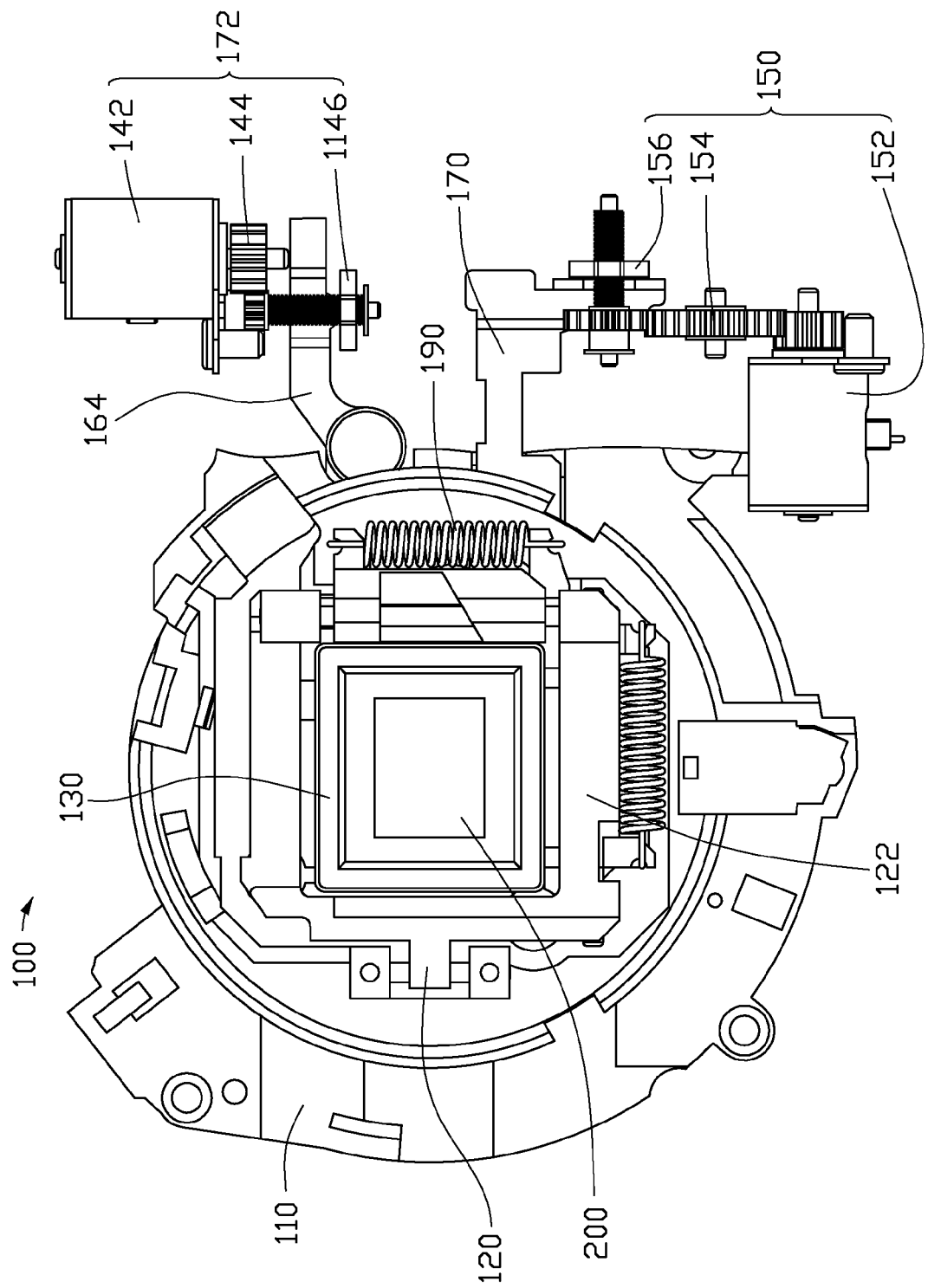
FIG. 5 is a planar view of a partial assembly of the image sensor holder of FIG. 3.
Figure 6:
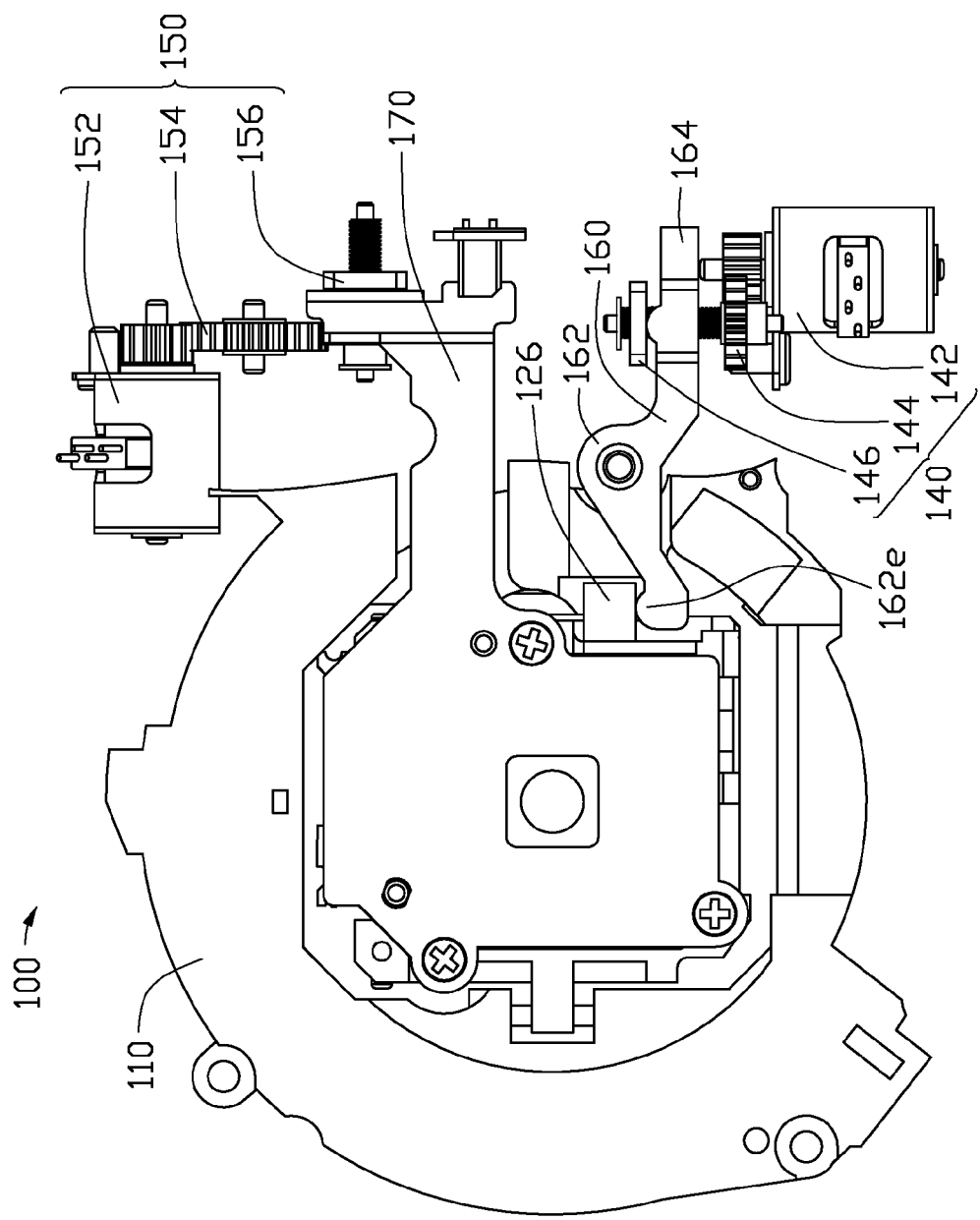
FIG. 6 is planar view of a partial assembly of the image sensor holder of FIG. 4.

Referring to FIGS. 5 and 6, in use, an image sensor chip 200 is attached on the second slidable holder 130. When the first driving device 140 operates, the first follower 146 can be moved linearly by the first transmitting mechanism 144 and the first motor 142. The first follower 146 forces the follower portion 164 of the first driving arm 160 to rotate clockwise relative to the pivot 1128 of the frame 110, as well as the rotation of the first driving arm 160. The first convex block 162e pushes the protrusion 126 of the first slidable holder 120 and drives the first slidable holder 120 along the first and second shafts 182, 184. During the sliding of the first slidable holder 120, the elastic members 190 hitched on the first and second hooks 1124c, 125 are resiliently deformed. When the first driving device 140 is powered off, the resiliently deformed elastic member 190 restores the first slidable holder 120 to an original position.

When the second driving device 150 operates, the second follower 156 can be moved linearly by the second transmitting mechanism 154 and the second motor 152. The moving second follower 156 drives the contact plate 176 to move the jutting portion 138 away from opening 113 so that second slidable holder 130 slides along the third and fourth shafts 186, 188. The elastic member 190 hitched on the third, fourth hooks 125a, 135 is resiliently deformed. When the second driving device 170 is powered off, the resiliently deformed elastic member 190 restores the second slidable holder 130 to an original position.

During motion of first slidable holder 120 and/or second slidable holder 130, the first and/or second driving arms 160/170 cause torque which can move the second slidable holder 130 and the first slidable holder 120 relative to the frame 110. Because the first and second driving arms 160, 170 directly drive the first and second slidable holders 120, 130 in two substantially orthogonal directions, the force-bearing points of the first and second driving arms 160, 170 are adjacent. In other words, there is a short distance between the two force-bearing points of the first and second slidable holders 120, 130. Therefore, torque caused by the first and the second driving arms 160, 170 can be held to an extremely low level, causing little movement of the first, second slidable holders 120, 130. First, second slidable holders 120, 130 will not move relative to the frame 110, and the precision of the location compensation of the image sensor holder 100 is improved significantly.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An image sensor holder comprising:
   a frame;
   a first slidable holder slidably mounted on the frame;
   a second slidable holder slidably mounted on the first slidable holder;
   a first and a second driving devices separately mounted on the frame;
   a first driving arm slidably mounted on the frame and contacting the first slidable holder and the first driving device by opposite ends thereof for transmitting driving force of the first driving device to drive the first slidable holder relatively to the frame along a first direction;
   a second driving arm slidably mounted on the frame and extending from the second slidable holder, and contacting the second driving device by an end thereof for transmitting driving force of the second driving device to drive the second slidable holder relatively to the first slidable holder along a second direction, the second direction perpendicular to the first direction; and
   at least two elastic members respectively positioned between the first slidable holder and the frame and between the first slidable holder and the second slidable holder for restoring the first and second slidable holders to their original positions.

2. The image sensor holder of claim 1, wherein the frame comprises a first support comprising an upper surface and an opposite lower surface, and defines a window through the upper surface and lower surface, a first and a second sliding channels on the lower surface thereof, the first and second sliding channels communicating to the window; the first slidable holder is received in the window; the first and second driving arms being correspondingly positioned in the first and second channels.

3. The image sensor holder of claim 2, wherein the frame further comprises a pivot formed on the bottom of the first sliding channel, on which the first driving arm pivots.

4. The image sensor holder of claim 2, wherein the frame further comprises a first shaft holder protruding substantially perpendicular from the upper surface adjacent to the window of the substrate and adjacent to the first and second sliding channels; the first slidable holder is slidably mounted on the first shaft holder by two shafts.

5. The image sensor holder of claim 2, wherein the frame further comprises a second support connected on a side of the first support and adjacent to the first and second sliding channels and on which the first and second driving devices are positioned.

6. The image sensor holder of claim 5, wherein the second support comprises an inner plate connected substantially perpendicular on a side of the substrate of the first support, an outer plate parallel to the inner plate, a top plate connecting the inner and outer plates, and a plurality of spacers substantially perpendicularly connected to the inner, an outer and a top plates and partitioning the space surrounded by the inner, the outer and the top plates into a first compartment and second compartment isolated from the first compartment; wherein the first driving device is received in the first compartment and the second driving device is received in the second compartment.

7. The image sensor holder of claim 6, wherein the top plate defines a first hole and a second hole therein corresponding to the first and second sliding channels; the inner plate defines a first cutout communicating the first sliding channel and first holes, and a second cutout communicating the second sliding channel and second holes; wherein the first driving arm passes through the first cutout and first hole connected to the first driving device; and the second driving arm passes through the second cutout and second hole connected to the second driving device.

8. The image sensor holder of claim 7, wherein the first driving arm comprises a driving portion contacting the first slidable holder and a follower portion connected to the first driving device.

9. The image sensor holder of claim 8, wherein the driving portion comprises a front arm contacting the first slidable holder and a rear arm which are connected at an angle and form a corner portion.

10. The image sensor holder of claim 9, wherein the driving portion further comprises a first convex block extending from the front arm and contacting the first slidable holder.

11. The image sensor holder of claim 9, wherein the frame further comprises a pivot formed on the bottom of the first sliding channel, in which the corner portion of the driving portion defines a pivot hole therein pivoting on the pivot of the frame thereby.

12. The image sensor holder of claim 1, wherein the second driving arm comprises a sliding plate, a limiting plate connected to the sliding plate, and a contact plate connected to the limiting plate; wherein the sliding plate is positioned in the second sliding channel and contacts the second slidable holder; the limiting plate and the contact plate are positioned in the second holes of the second support; the contact plate is connected to the second driving device.

13. The image sensor holder of claim 12, wherein the limiting plate comprises a contact block perpendicularly formed on an end thereof and contacting the second slidable holder.

14. The image sensor holder of claim 13, wherein the first slidable holder comprises a square framework and a number of first frame walls perpendicularly connected, and a protrusion projected outward from an outer surface of one frame wall and contacting the contact block of the second driving arm.

15. The image sensor holder of claim 1, wherein the second slidable holder comprises a square framework and a number of second frame walls perpendicularly connected and a jutting portion formed on the second slidable holder blocking an opening formed on the upper surface.

* * * * *